(12) United States Patent
Braunecker et al.

(10) Patent No.: US 12,364,966 B2
(45) Date of Patent: Jul. 22, 2025

(54) COMPOSITIONS AND METHODS FOR MONITORING GAS ADSORPTION

(71) Applicant: Alliance for Sustainable Energy, LLC, Golden, CO (US)

(72) Inventors: Wade Adam Braunecker, Lafayette, CO (US); Noemi Leick, Boulder, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 362 days.

(21) Appl. No.: 18/185,747

(22) Filed: Mar. 17, 2023

(65) Prior Publication Data

US 2023/0294072 A1   Sep. 21, 2023

Related U.S. Application Data

(60) Provisional application No. 63/321,678, filed on Mar. 19, 2022.

(51) Int. Cl.
| | | |
|---|---|---|
| *B01D 53/00* | (2006.01) | |
| *B01D 53/04* | (2006.01) | |
| *B01J 20/26* | (2006.01) | |
| *B01J 20/28* | (2006.01) | |
| *B01J 20/32* | (2006.01) | |

(52) U.S. Cl.
CPC ........ *B01J 20/262* (2013.01); *B01D 53/0407* (2013.01); *B01D 53/0454* (2013.01); *B01J 20/2805* (2013.01); *B01J 20/28069* (2013.01); *B01J 20/28078* (2013.01); *B01J 20/28097* (2013.01); *B01J 20/3204* (2013.01); *B01D 2253/202* (2013.01); *B01D 2253/308* (2013.01); *B01D 2253/311* (2013.01); *B01D 2257/504* (2013.01); *B01D 2259/126* (2013.01); *B01D 2259/802* (2013.01)

(58) Field of Classification Search
CPC combination set(s) only.
See application file for complete search history.

(56) References Cited

U.S. PATENT DOCUMENTS

| | | | |
|---|---|---|---|
| 2015/0031607 A1 | 1/2015 | Tang et al. | |
| 2019/0375895 A1* | 12/2019 | Awadh | C08F 283/00 |
| 2021/0059868 A1* | 3/2021 | Gannett | A61F 13/266 |
| 2021/0310906 A1* | 10/2021 | Takeuchi | B01J 20/22 |

FOREIGN PATENT DOCUMENTS

JP    2006286419 A   * 10/2006

OTHER PUBLICATIONS

Https://www.sarchemlabs.com/product/chitosan/ (Year: 2013).*

(Continued)

*Primary Examiner* — T. Bennett McKenzie
(74) *Attorney, Agent, or Firm* — Michael A. McIntyre

(57) ABSTRACT

The present disclosure relates to a composition that includes tetrakis(4-hydroxyphenyl)ethylene (THPE), an amino polymer, and a substrate that includes a metal oxide, where the substrate has a pore volume, and the THPE and the amino polymer are positioned within the pore volume.

20 Claims, 12 Drawing Sheets

(56) References Cited

OTHER PUBLICATIONS

Dimonie et al., "Influence of Centrifugation on the Molecular Parameters of Chitosan Solubilized in Weakly Acidic Aqueous Solutions," Digest Journal of Nanomaterials and Biostructures, vol. 8, No. 4, Oct.-Dec. 2013, p. 1799-1809. (Year: 2013).*
Aldred, M.P. et al., "Optical Properties and Photo-Oxidation of Tetraphenylethene-Based Fluorophores," Chem. Eur. J., vol. 18, 2012, 9 pages.
Askar, S. et al., "Residual stress relaxation and stiffness in spin-coated polymer films: Characterization by ellipsometry and fluorescence," Polymer, vol. 76, 2015, 10 pages.
Askar, S. et al., "Stiffness of thin, supported polystyrene films: Free-surface, substrate, and confinement effects characterized via self-referencing fluorescence," Polymer, vol. 99, 2016, 10 pages.
Baglay, R. et al., "Communication: Experimentally determined profile of local glass transition temperature across a glassy-rubbery polymer interfaced with a Tg difference of 80 K," Journal of Chemical Physics, vol. 143, 2015, 5 pages.
Baglay, R. et al., "Local glass transition temperature Tg(z) of polystyrene next to different polymers: Hard vs. soft confinement," The Journal of Chemical Physics, vol. 146, 2017, 13 pages.
Bao, S. et al., "Sensitive and reliable detection of glass transition of polymers by fluorescent probes based on AIE luminogens," Polymer Chemistry, vol. 6, 2015, 6 pages.
Barbara, P.F. et al., "Direct Measurements of Tetraphenylethylene Torsional Motion by Picosecond Spectroscopy," Journal of the American Chemical Society, vol. 103, 1981, 7 pages.
Burroughs, M.J. et al., "21st Century Advances in Fluorescence Techniques to Characterize Glass-Forming Polymers at the Nanoscale," Macromolecular Chemistry and Physics, vol. 219, 2018, 22 pages.
Ellison, C.J. et al., "Confinement and processing effects on glass transition temperature and physical aging in ultrathin polymer films: Novel fluorescence measurements," European Physical Journal E, vol. 8, 2002, 12 pages.
Glusac, K., "From Captured CO2 to Value-Added Chemicals: A Photochemical Approach," U.S. Department of Energy, National Energy Technology Laboratory, Direct Air Capture Kickoff Meeting, Feb. 24-25, 2021, 7 pages.
Guan, X. et al., "A New Thermo-, pH-and CO2-Responsive Fluorescent Four-Arm Star Polymer with Aggregation-Induced Emission for Long-Term Cellular Tracing," Macromolecular Materials and Engineering, vol. 303, 2018, 10 pages.
Hamdy, L.B. et al., "The application of amine-based materials for carbon capture and utilisation: an overarching view," RSC Materials Advances, vol. 2, 2021, 38 pages.
Heydari-Gorji, A. et al., "Thermal, Oxidative, and CO2-Induced Degradation of Supported Polyethylenimine Adsorbents," American Chemical Society, I & EC Research, vol. 51, 2012, 8 pages.
Holewinski, A. et al., "Linking CO2 Sorption Performance to Polymer Morphology in Aminopolymer/Silica Composites through Neutron Scattering," Journal of the American Chemical Society, vol. 137, 2015, 11 pages.
Hooker, J.C. et al., "Coupling of Probe Reorientation Dynamics and Rotor Motions to Polymer Relaxation As Sensed by Second Harmonic Generation and Fluorescence," Macromolecules, vol. 28, 1995, 10 pages.
Jimbo, T. et al., "Control of Aggregation-Induced Emission from a Tetraphenylethene Derivative through the Components in the Co-crystal," Crystal Growth and Design, vol. 18, 2018, 7 pages.
Kim, S. et al., "Distribution of Glass Transition Temperatures in Free-Standing, Nanoconfined Polystyrene Films: A Test of de Gennes' Sliding Motion Mechanism," Macromolecules, vol. 44, 2011, 8 pages.
Lu, W. et al., "Aggregation-induced emission of tetraphenylethylene-modified polyethyleneimine for highly selective CO2 detection," Sensors and Actuators B: Chemical, vol. 228, 2016, 6 pages.
Ma, Y. et al., "A water-soluble tetraphynylethene based probe for luminescent carbon dioxide detection and its biological application," Journal of Materials Chemistry C, vol. 3, 2015, 7 pages.
Mundra, M.K. et al., "Fluorescence studies of confinement in polymer films and nanocomposites: Glass transition temperature, plasticizer effects, and sensitivity to stress relaxation and local polarity," European Physical Journal, Special Topics, vol. 141, 2007, 9 pages.
Paeng, K. et al., "Direct Measurement of Molecular Motion in Freestanding Polystyrene Thin Films," Journal of the American Chemical Society, vol. 133, 2011, 4 pages.
Paeng, K. et al., "Molecular mobility in supported thin films of polystyrene, poly(methylmethacrylate), and poly(2-vinyl pyridine) probed by dye reorientation," Soft Matter, vol. 8, 2012, 8 pages.
Priestley, R.D. et al., "Structural Relaxation of Polymer Glasses at Surfaces, Interfaces, and In Between," Science, vol. 309, Jul. 15, 2005, 5 pages.
Prud'Homme, A. et al., "Comparison between Linear and Branched Polyethylenimine and Reduced Graphene Oxide Coatings as a Capture Layer for Micro Resonant CO2 Gas Concentration Sensors," Sensors, vol. 20, 2020, 21 pages.
Sanz-Perez, E. et al., "Direct Capture of CO2 from Ambient Air," Chemical Reviews, vol. 116, 2016, 37 pages.
"Transformational LDRD—Reactive DAC," NREL concept paper, Jan. 13, 2022, 7 pages.
Uemura, T. et al., "Unveiling thermal transitions of polymers in subnanometre pores," Nature Communications, Oct. 5, 2010, 8 pages.
Wang, C. et al., "Fluorescent sensors based on AIEgen-functionalised mesoporous silica nanoparticles for the detection of explosives and antibiotics," Inorganic Chemistry Frontiers, vol. 5, 2018, 6 pages.
Zhou, L. et al., "Light-driven methane dry reforming with single atomic site antenna-reactor plasmonic photocatalysts," Nature Energy, vol. 5, Jan. 2020, 10 pages.

* cited by examiner

COMPOSITIONS AND METHODS FOR MONITORING GAS ADSORPTION

CROSS-REFERENCE TO RELATED APPLICATIONS

This application claims priority from U.S. Provisional Patent Application No. 63/321,678 filed on Mar. 19, 2022, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

SUMMARY

An aspect of the present disclosure is a composition that includes tetrakis(4-hydroxyphenyl)ethylene (THPE), an amino polymer, and a substrate that includes a metal oxide, where the substrate has a pore volume, and the THPE and the amino polymer are positioned within the pore volume. In some embodiments of the present disclosure, the amino polymer may have a glass-transition temperature ($T_g$) between −65° C. and +100° C. In some embodiments of the present disclosure, the amino polymer may have a melting temperature ($T_m$) between −20° C. and +100° C. In some embodiments of the present disclosure, the amino polymer may have a molecular weight greater than or equal to 600 g/mol.

In some embodiments of the present disclosure, the amino polymer may include a poly(ethylenimine) (PEI). In some embodiments of the present disclosure, the PEI may be branched. In some embodiments of the present disclosure, the PEI may have a molecular weight between 600 g/mol and 1000 g/mol. In some embodiments of the present disclosure, the THPE in the amino polymer may be at a concentration between greater than 0 wt. % and 10 wt. %, relative to the total weight of the amino polymer and the THPE. In some embodiments of the present disclosure, the amino polymer and the THPE may be present at a combined concentration between greater than 0 wt. % and less than 60 wt. %, relative to the total weight of the composition.

In some embodiments of the present disclosure, the pore volume may be between greater than 0 cm$^3$/g and less than or equal to 10 cm$^3$/g. In some embodiments of the present disclosure, the pore volume may be characterized by a plurality of mesopores having an average diameter between 1 nm and 200 nm. In some embodiments of the present disclosure, the metal oxide may include at least one of alumina, silica, and/or titania. In some embodiments of the present disclosure, the silica may be characterized by a surface area (SA), where 30 m$^2$/g≤SA<850 m$^2$/g. In some embodiments of the present disclosure, the silica may be characterized by a surface area (SA), where 60 m$^2$/g≤SA<500 m$^2$/g. In some embodiments of the present disclosure, the THPE may be soluble within the amino polymer and fluoresces when irradiated with light having a wavelength of about 365 nm. In some embodiments of the present disclosure, the amino polymer may be capable of reversibly adsorbing and desorbing $CO_2$.

In some embodiments of the present disclosure, the amino polymer may be capable of reversibly switching between a glassy state and at least one of a liquid state or rubbery state, such that when in the liquid state or rubbery state, the amino polymer is capable of adsorbing and desorbing $CO_2$, and when the amino polymer contains between 0.001 moles and 1.0 mole of adsorbed $CO_2$ per mole of amine provided by the amino polymer, the amino polymer switches from the liquid state or rubbery state to the glassy state. Further, when the amino polymer is in the liquid or rubbery state, the dissolved THPE may fluoresce light with a $\lambda_{max1}$ between 480 nm and 540 nm, and when in the amino polymer is in a glassy state, the dissolved THPE may fluoresce light with a $\lambda_{max2}$ between 455 nm and 480 nm. In some embodiments of the present disclosure, the amino polymer may contain between 0.01 moles and 0.2 moles of adsorbed $CO_2$ per mole of amine provided by the amino polymer, when the switching occurs. In some embodiments of the present disclosure, $\lambda_{max1}$ may be about 530 nm and $\lambda_{max2}$ may be about 460 nm.

An aspect of the present disclosure is a method that includes a first transferring of $CO_2$ from a first gas stream to a composition containing an amino polymer and THPE, and a second transferring of the $CO_2$ from the composition to at least one of a second gas stream or a vapor stream, where the first transferring and the second transferring are repeated in series at least twice, the amino polymer is capable of reversibly switching between a glassy state and a liquid state or rubbery state, when in the liquid state or rubbery state, the amino polymer is capable of adsorbing the $CO_2$ during the first transferring, when in the liquid state or rubbery state, the amino polymer is capable of desorbing the $CO_2$ during the second transferring, and when the amino polymer contains between 0.001 moles and 1.0 mole of adsorbed $CO_2$ per mole of amine provided by the amino polymer, the amino polymer switches from the liquid state or rubbery state to the glassy state. Further, when the amino polymer is in the liquid or rubbery state, the dissolved THPE fluoresces light with a $\lambda_{max1}$ between 480 nm and 540 nm, and when in the amino polymer is in the glassy state, the dissolved THPE fluoresces light with a $\lambda_{max2}$ between 455 nm and 480 nm.

BACKGROUND

As countries around the world work to reduce their carbon footprint, direct air capture (DAC) systems will play an increasingly important role in curbing net global greenhouse gas emissions through $CO_2$ removal. Amino polymers such as poly(ethylenimine) are a promising class of compounds for $CO_2$ removal using DAC systems. However, there are a myriad of factors (e.g., gas conditions, cycling conditions, etc.) that can influence the mobility, flowability, and viscosity of amino polymers and/or polymeric additives in DAC systems, which can subsequently affect mass transfer of gas into and out of these materials. Therefore, the design of more efficient next-generation DAC processes would benefit from a thorough understanding of the relationships between operating conditions and mass transfer. Thus, there remains a need for improved materials and methods for assessing the condition and $CO_2$-adsorbing capacity of amino polymers, especially in situ, in the DAC systems using such polymers.

BRIEF DESCRIPTION OF DRAWINGS

Some embodiments are illustrated in referenced figures of the drawings. It is intended that the embodiments and figures disclosed herein are to be considered illustrative rather than limiting.

DETAILED DESCRIPTION

Figure 1:
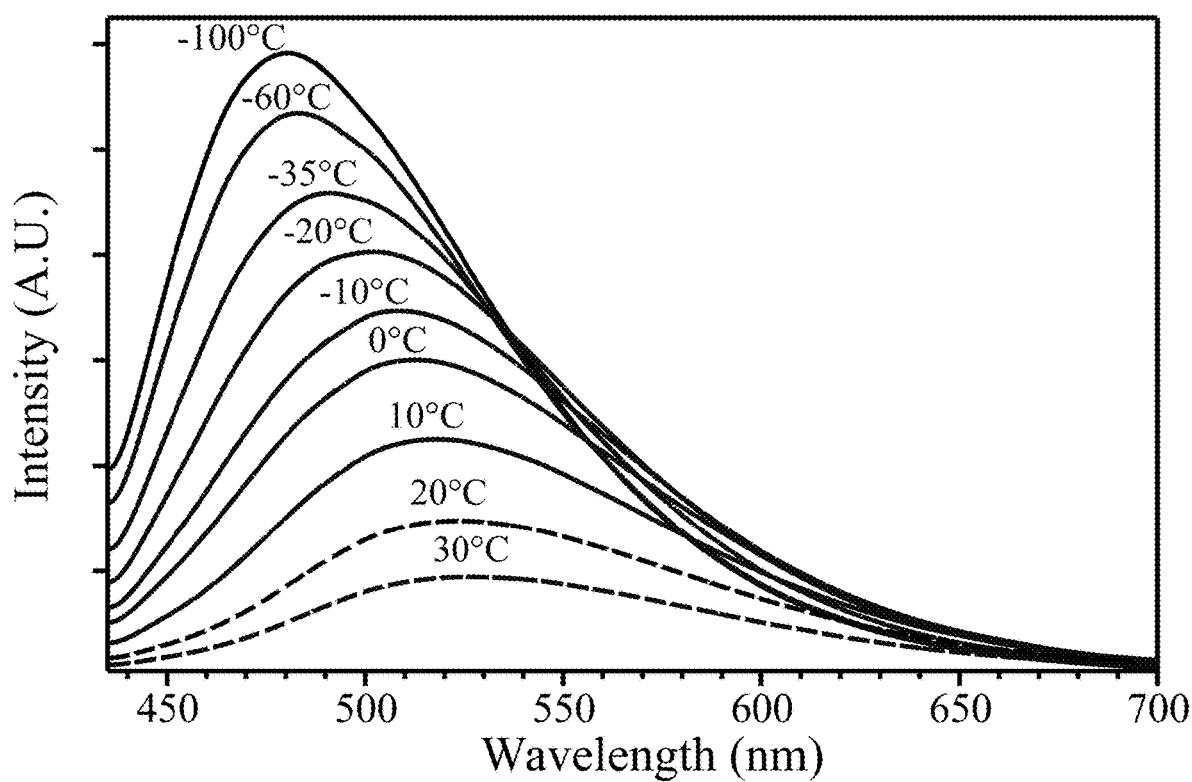
FIG. 1 illustrates emission spectra of PEI$_{800}$ doped with 1 wt % THPE upon cooling and heating at 1° C./min. (Excitation at 365 nm), according to some embodiments of the present disclosure.

Amino polymers used in direct air capture are known to degrade over time. This degradation is influenced by the simultaneous presence of oxygen, ambient humidity, and temperature swings, such that the exact lifetime of the polymer is dependent on the geographic location of the direct air capture (DAC) systems as well as the local annual weather patterns. As described herein, to address the uncertainty associated with amino polymer lifetime, a fluorescent molecule (i.e., probe molecule) has been developed that can be embedded in an amino polymer-based DAC support and used for "in operando" assessment of the amino polymer's ability to satisfactorily adsorb and desorb $CO_2$. The probe molecule can be employed to assess several relevant polymer properties, including the general mobility of a polymer (where the term "mobility" refers to the molecular-scale movement of the polymer's side-chains), the glassiness of a polymer upon $CO_2$ uptake, and the state of the polymer's physical structure and/or the degradation thereof. Some of the materials and compositions described herein may be readily applied to fields that use sorbents (e.g., systems based on polymers, ionic liquids, organic frameworks) to capture $CO_2$ from dilute or concentrated gas streams, such as direct air capture (DAC), direct ocean capture (DOC), carbon capture utilization and storage (e.g., flue gas, cement production, plastic production), and technologies converting $CO_2$ to fuels and chemicals.

Thus, among other things, the present disclosure relates to compositions which can be utilized in DAC systems, as well as other $CO_2$ capture systems for the removal of $CO_2$ from the environment. In some embodiments of the present disclosure, such compositions include a molecule capable of fluorescing and a polymer capable of reversibly binding $CO_2$. In some embodiments of the present disclosure, a molecule capable of fluorescing may include a tetraphenylethylene (TPE), for example tetrakis(4-hydroxyphenyl)ethylene (THPE). Structure 1 illustrates THPE.

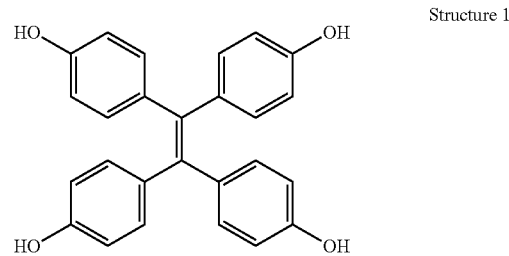 [SMILES: Oc1ccc(C(=C(c2ccc(O)cc2)c2ccc(O)cc2)c2ccc(O)cc2)cc1]

Structure 1

In an exemplary DAC system, $CO_2$ is extracted directly from the atmosphere by processing air with industrial fans over a high surface area, low pressure drop contactor that is coated with a porous metal oxide. The latter is in turn loaded with a liquid amino polymer that selectively binds $CO_2$ as carbamate species or carbonate salts. As these species form, the polymer becomes electrostatically cross-linked, which transforms the polymer from a liquid state (i.e., fluid-like state and/or rubber-like, and/or rubbery state) to a glassy state that in turn severely impedes additional $CO_2$ uptake. Once this happens and the polymer becomes glassy, it is no longer efficient to continue blowing air through the system to drive further adsorption; at this point, the desorption cycle is started by blowing steam through the system. The amount of time the adsorption cycle is conducted, and thus optimization of the entire process, is highly dependent on several factors that influence how quickly the polymer becomes glassy, which include the relative humidity in the atmosphere, the extent of degradation of the adsorbent polymer, or the presence of plasticizing additives in the polymer. The addition of a fluorescent probe dissolved into the polymer matrix that emits at different wavelengths of light depending on whether the polymer is in a liquid or glassy state can take all of the guess work out of the optimization process and the adsorption cycle time.

As described herein, a polymer capable of reversibly binding $CO_2$ may include an amine, such as an amino polymer, with poly(ethylenimine) (PEI) being one example. A polymer capable of binding $CO_2$ may be branched and/or a straight-chained polymer. In some embodiments of the present disclosure, the $CO_2$ binding polymer, e.g., PEI, may have a molecular weight of at least 600 g/mol. In some embodiments of the present disclosure, a $CO_2$ binding polymer, e.g., PEI, may have a molecular weight between 600 g/mol and 1000 g/mol. In some embodiments of the present disclosure, a $CO_2$ binding polymer may be characterized by having a glass-transition temperature ($T_g$) between −65° C. and +100° C. In some embodiments of the present disclosure, a $CO_2$ binding polymer may be characterized by having a melting temperature ($T_m$) between −20° C. and +100° C. Generally, the lower the melting or glass transition temperature of the polymer, the more efficient it will be at taking up $CO_2$, particularly in cold climates. However, even polymers with a relatively high $T_g$ (above ambient temperature, where they are glassy before any $CO_2$ is taken up) can still be made useful through the addition of plasticizing additives that lower the $T_g$ of a composite. While these inert additives would lower the overall theoretical $CO_2$ capacity of the system, the tradeoff could be worth it for polymers that were slower to degrade.

In some embodiments of the present disclosure, the molecule capable of fluorescing may be present in the homogeneous mixture of the molecule and the polymer at a concentration between 0 wt. % and 10 wt. %, relative to the total weight of the mixture, or between 0.01 wt. % and 0.5 wt. %. The presence of large amounts of probe are undesirable as high concentrations of the probe molecule can serve to raise the $T_g$ of the polymer in which it is dissolved.

In some embodiments of the present disclosure, a composition that includes a molecule (capable of fluorescing) and a polymer (capable of binding $CO_2$) may also include a solid metal oxide, that provides a support for at least one of the polymer and/or molecule. Example of suitable metal oxides that may be used as supports include at least one of silica, titania, and/or alumina. In some embodiments, a metal oxide support may contain a pore volume, where the mixture is positioned within at least a portion of the pore volume. In some embodiments of the present disclosure, the pore volume may be between greater than 0 cm³/g and 10 cm³/g, or between 0.1 and 1 cm³/g. In some embodiments of the present disclosure, at least a portion of a solid support, e.g., metal oxide, may remain substantially free (i.e., empty) of mixture, thereby providing a path for air (and $CO_2$) to enter the solid support and contact the polymer (with fluorescing molecule) contained therein.

In some embodiments of the present disclosure, the internal structure of a solid support may be characterized by a plurality of mesopores having an average diameter between 1 nm and 200 nm, or between 30 nm and 80 nm. In some embodiments of the present disclosure, the mixture may be present within the pore volume at a concentration between greater than 0 wt. % and 60 wt. %, relative to the total weight of the mixture and the solid support. In some embodiments of the present disclosure, a solid support may be in the form of a particle having a characteristic length between 100 nm and 1,000 µm, with characteristic shapes including, spherical, cylindrical, and/or irregular particle shapes.

Tetrakis(4-hydroxyphenyl)ethylene (THPE) Fluorescence in Small Molecule Matrices.

Structure 1 illustrates the chemical structure of THPE, which can be dispersed in bulk amino polymers, including linear poly(ethylenimine) (PEI) and branched PEI. Even amino polymers with very low glass transition temperatures can effectively become glassy at higher temperatures upon $CO_2$ uptake; thus, a fluorescent probe molecule developed to study the molecular mobility in amino polymer-based DAC systems would ideally operate in a predictable fashion over a wide range of temperatures. Thus, to evaluate the fluorescence response of THPE, its behavior was studied in several different small molecule organic solvents, namely tetrahydrofuran (THF), naphthalene, and 2,6-dimethylbenzonitrile (DMB), with corresponding $T_m$ values of −109, 80, and 89° C., respectively. Small molecule matrices are attractive because they tend to have well-defined thermal transitions as well as tunable melting point values and polarities.

While THPE is essentially non-emissive in THF at room temperature, the fluorescence spectrum of a 0.02 wt % solution of THPE in frozen THF at −180° C. showed intense emission at a $\lambda_{max}$ of 458 nm (see FIG. 1) when irradiated with a 365 nm UV light. Both the emission $\lambda_{max}$ and the photoluminescence quantum yield (PLQY) stayed essentially constant between −180° C. and −140° C., changing less than 2%. However, between −120° C. and −100° C., the relative fluorescence intensity dropped by a factor of 20 (FIG. 1, top panel), and $\lambda_{max}$ red shifted with increasing temperature. Above −100° C., $\lambda_{max}$ stayed essentially constant at −525 nm, though signal to noise became very poor at these conditions. In the lower panel of FIG. 2, the change in ratiometric intensity is plotted as a function of temperature; 530 nm and 460 nm were selected as representative of $\lambda_{max}$ at the relative warm and cold temperatures, respectively, for the different samples described herein. From the plots in FIG. 2, both fluorescence intensity at 460 nm as well as the change in ratiometric intensity appear to be good indicators of the melting point of THF (−109° C.).

The same general trend in fluorescence behavior of THPE was observed for a 0.02 wt % sample doped into DMB, albeit shifted 200° C. This sample was prepared by stirring THPE and DMB at 110° C. for 1 h under $N_2$ in the dark, and then cooling to room temperature. The ratiometric fluorescence intensity (530 nm/460 nm) of this sample remained relatively constant between 20° C. and 80° C., but then underwent dramatic change above the melting point of DMB (89° C.). While the fluorescence intensity at 460 nm dropped>15% between 20° C. and 80° C., there was a marked decrease above the melting point (m.p.) of DMB, and the solution was only weakly emissive above 110° C.

Figure 2:
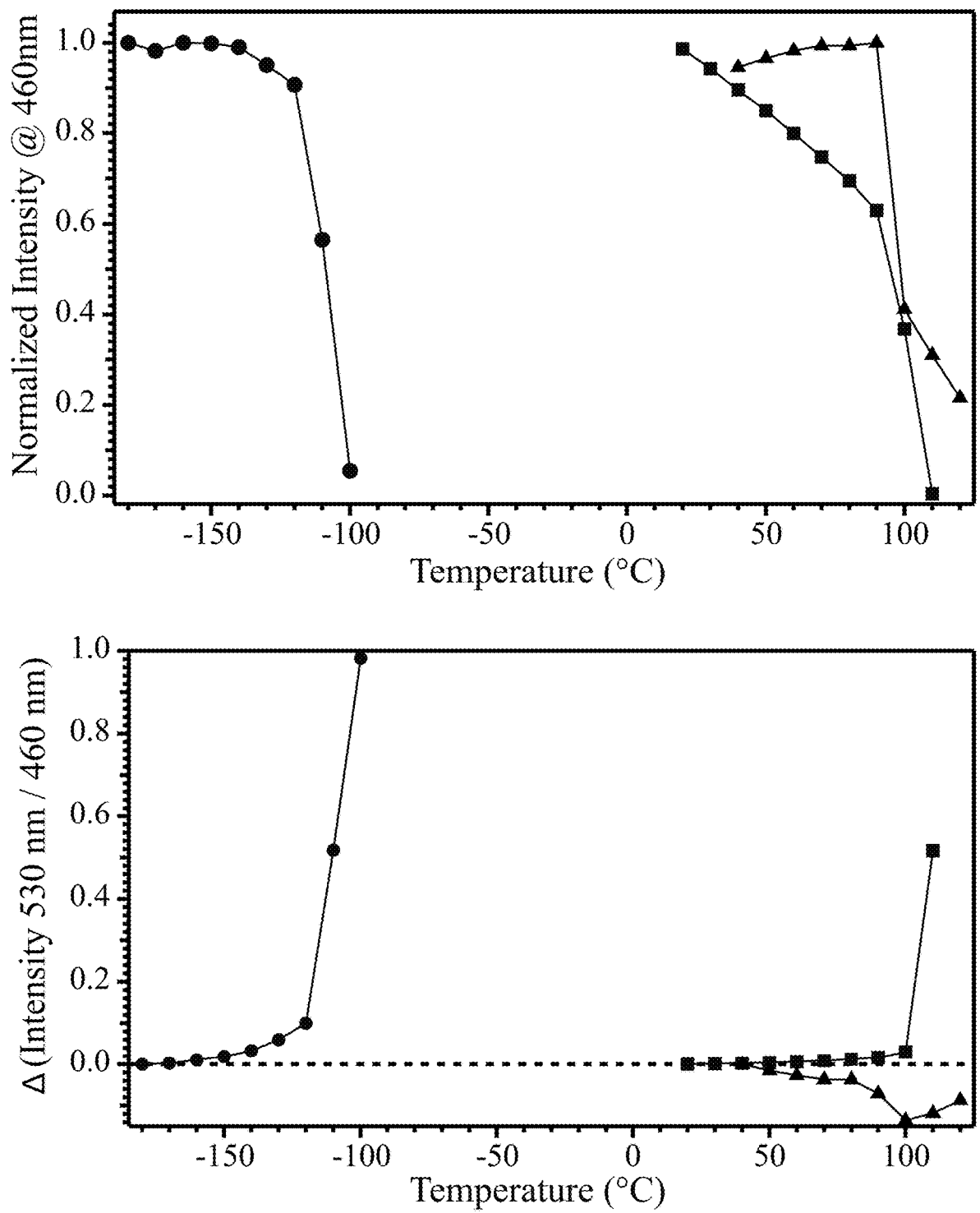
FIG. 2 illustrates—Top panel: normalized fluorescence intensity at 460 nm as a function of temperature for 0.02 wt % THPE solutions in tetrahydrofuran (circles), naphthalene (triangles), and 2,6-dimethylbenzonitrile (squares), according to some embodiments of the present disclosure. Bottom panel: ratiometric fluorescence intensity (530 nm/460 nm) for the same data set, according to some embodiments of the present disclosure. Dashed vertical lines indicate literature melting point values.

In contrast to the THF and DMB solutions, the ratiometric fluorescence response of THPE was markedly different when the molecule was dispersed into naphthalene. Note, while THPE would fully dissolve in the former two solutions, rapid stirring in liquid naphthalene at 110° C. for 1 hour produced a very fine suspension that scattered light, indicative of THPE aggregation. Upon heating a 0.02 wt % suspension from room temperature through its melting point (80° C.) up to 120° C., the emission maximum remained essentially constant near 450 nm, and no dramatic increase in ratiometric intensity near the m.p. of the solvent was observed as in the other two solvents. The results were consistent with the observation that THPE aggregates in liquid naphthalene, which would restrict intramolecular rotation, even above the melting temperature of the matrix. As used herein, the term "matrix" refers to the phase into which the probe molecule is dispersed. So, in the examples above that refer to the probe molecule in a solvent, the solvent is the "matrix". In other cases, the amino polymer may be referred to as the "matrix" and in still other cases, a polymer containing moisture may be referred to as the "matrix". Note that while the shape of the emission spectra did not change, the absolute fluorescence intensity of THPE in naphthalene does start to drop significantly above 90° C. (FIG. 2, top panel). Taken as a whole, the results suggest that THPE can be employed as a reliable indicator of small molecule phase changes over a range of nearly 200° C. (between −109° C. and +89° C.), and furthermore the molecule is an excellent ratiometric probe over this range when well solvated in its matrix (THF and DMB).

Polymer Chain Mobility and Thermal Transitions.

Figure 3:
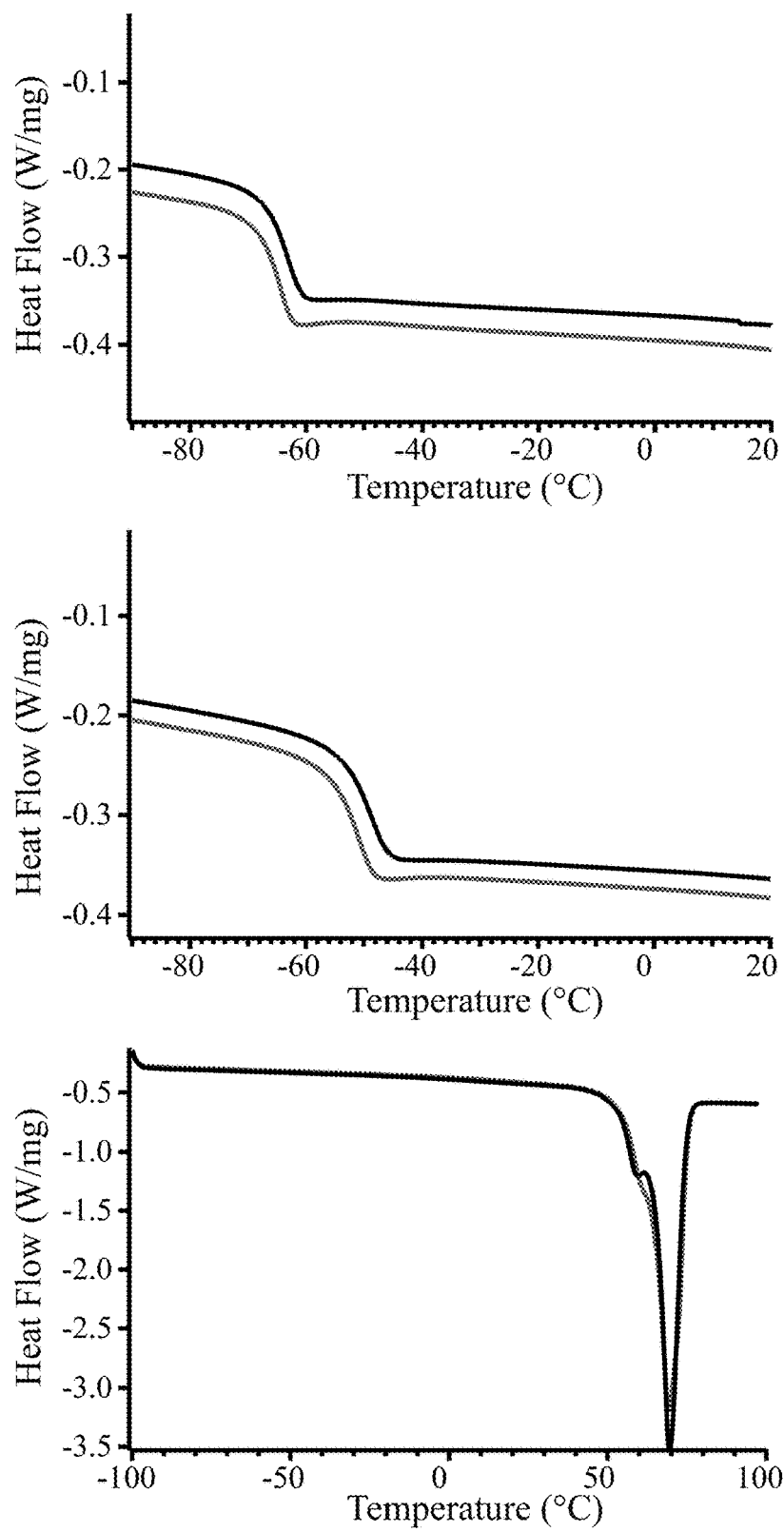
FIG. 3 illustrates DSC traces of bulk PEI polymers with and without 1 wt. % THPE: Branched $PEI_{800}$ (top), branched $PEI_{25,000}$ (middle), and linear $PEI_{2,500}$ (bottom), according to some embodiments of the present disclosure. Dark line— 1.0 wt. % probe molecule; Lighter line—Bulk PEI.

DSC data. Prior to investigating polymer thermal transitions with the fluorescent probe molecule, DSC was used to determine the effect of doping up to 1 wt. % of the fluorescent probe molecule into a series of amino polymer samples (PEI) with different molecular weights and architectures. A fundamental requirement of using any probe molecule to investigate mobility of a medium (e.g., amino polymer) is that the presence of the probe molecule should have a minimal effect on the medium. In Table 1, thermal transitions of bulk polymer recorded by DSC are compared with fluorescent molecule (e.g., THPE) doped polymer transitions for branched PEI samples with weight average molecular weights (Mw) of 800 g/mol and 25,000 g/mol and a linear PEI sample with Mw~2,500 g/mol. The traces are illustrated in FIG. 3 and were recorded at a heating rate of 10° C./min. Values of $T_g$ for the branched PEI samples were estimated at −65 and −52° C. for low (800 g/mol) and high (25.00 g/mol) molecular weight samples, respectively. The onset of $T_m$ for the linear PEI sample occurred at 54° C. As seen in Table 1, fluorescent molecule doped polymer samples differed by only 1-2° C. when compared with the neat sample. Although doping at lower concentrations of fluorescent molecule (0.02 wt. %) made these already small differences completely negligible, employing 1 wt. % fluorescent molecule gave substantially better signal to noise during fluorescence measurements with polymer systems. Improved signal to noise allowed spectra to be collected with an overall lower intensity of excitation light and/or with a shorter duration of light exposure, both of which lead to less artifacts in the mobility data (vide infra).

TABLE 1

Thermal transitions recorded with DSC (° C.).

| Polymer | Neat | 1 wt % THPE |
|---|---|---|
| L-PEI$_{2,500}$[a] | 54 | 53 |
| B-PEI$_{800}$[b] | −65 | −64 |
| B-PEI$_{25,000}$[b] | −52 | −50 |

Heating rate = 10° C. min$^{-1}$.
[a]Onset temperature of melting (° C.).
[b]Estimation of the polymerglass transition temperature (° C.).

Photostability and Cycling. In the presence of oxygen, tetraphenylethylene (TPE) and its derivatives (e.g., THPE) can be photo-oxidized to a diphenylphenanthrene derivative within minutes of UV exposure at irradiances used in this work (~1 mW cm$^{-2}$), both in solution and in the solid state. However, under an inert $N_2$ atmosphere, THPE was observed to generally be photostable towards any degradation on the timescale of the experiments completed herein. A photostability study was performed on a composition of 50 wt. % branched PEI$_{800}$ and positioned within a commercial grade mesoporous silica (MCM-41) solid support (50 wt. %=(mass of PEI+THPE)/(mass of PEI+THPE+mass of silica)*100%). PEI was doped with 1 wt. % THPE relative to the polymer. Stability of the probe molecule was then investigated over a wide range of temperatures (between −120° C. and 100° C.) by holding the sample at a given temperature under inert atmosphere, exciting the sample for 5 seconds at ~1 mW cm$^{-2}$ of 365 nm light to collect an emission spectrum, and then performing 4 subsequent measurements over the course of 10 minutes. Emission spectra from each of these 5 measurements were compared and monitored for changes due to photobleaching or degradation. It was found that below room temperature, the first and fifth emission spectra were virtually indistinguishable, implying excellent photostability under these conditions. At room temperature, intensity of the first and fifth emission spectra varied only 1%. At 100° C., the intensity of the fifth emission spectra was ~5% lower than that of the first spectrum, though the ratiometric intensity (530/460 nm) remained essentially constant. The results suggest the probe molecule is more than sufficiently photostable during the collection of a typical emission spectrum to infer reliable polymer mobility information at all temperatures tested herein.

Note that at temperatures above the $T_g$ of the polymer, where both the polymer matrix and the THPE molecule are more mobile, longer durations of light excitation/exposure (on the order of minutes) can result in a red shift in the recorded emission spectrum as compared to a spectrum collected over 5 seconds. Presumably, this is the result of localized heating that can be attributed to the excited state THPE molecule rotating more freely and dissipating more energy to the matrix through non-radiative (thermal) decay mechanisms. If allowed to re-equilibrate for several minutes after longer light exposures, the spectrum will blue-shift back to its original shape. This is noted as a word of caution when inferring differences in polymer mobility across samples at a given temperature; light exposure should be both minimized and held constant across samples. Below the polymer $T_g$ where THPE rotation is restricted, this reversible red-blue shift phenomenon was not observed.

Figure 4:
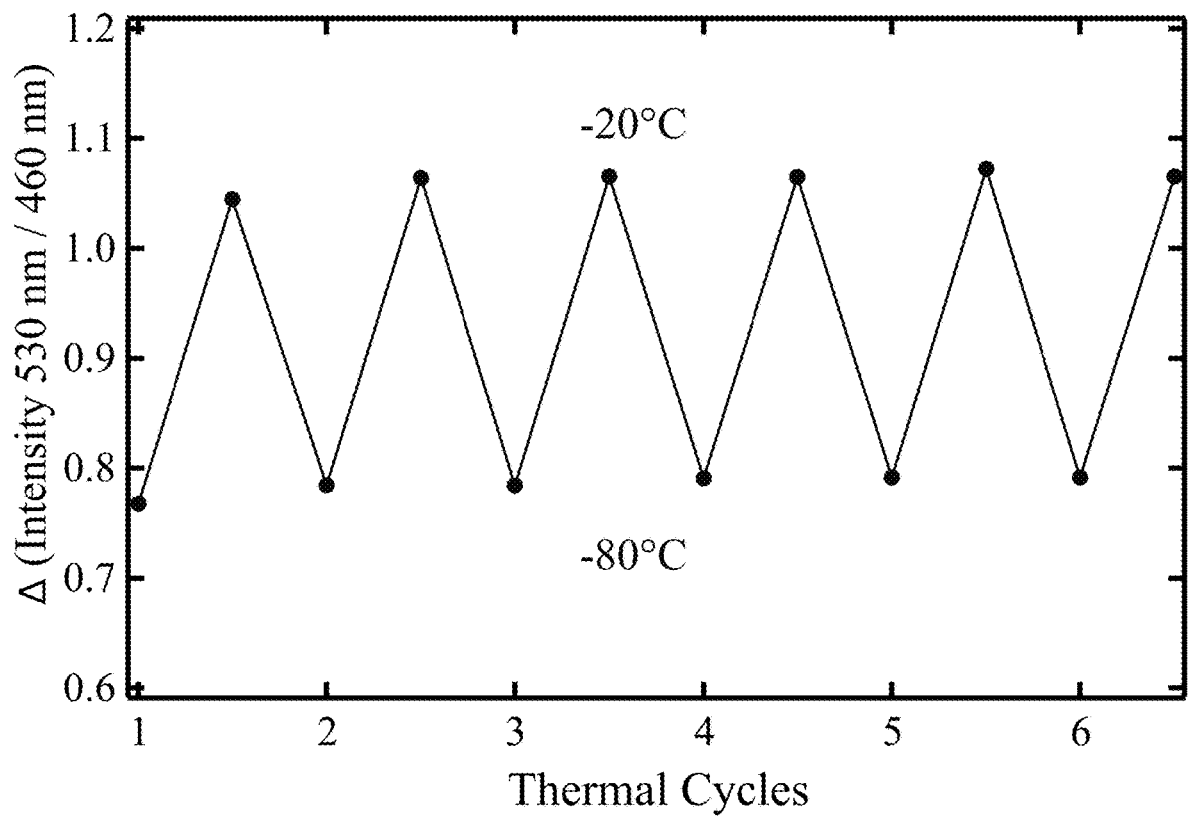
FIG. 4 illustrates ratiometric fluorescence intensity (530 nm/460 nm) for SBA15-OH with 50 wt. % PEI doped with 1 wt. % THPE, according to some embodiments of the present disclosure. The sample was cycled 6 times between −80 and −20° C., above and below the $T_g$ of −65° C.

In addition, THPE-doped PEI was cycled above and below its $T_g$ to ensure that THPE was not aggregating with time at colder temperatures and that the measurements were fully reproducible upon cycling. In FIG. 4, ratiometric fluorescence intensity is illustrated for a 50 wt. % composite of branched PEI$_{800}$ and mesoporous silica (SBA15-OH). PEI was doped with 1 wt. % THPE and the sample was cycled 6 times above and below its $T_g$ (−65° C.) for a total of 12 measurements. FIG. 4 illustrates how constant the ratio remains at a given temperature, particularly for cycles 2 through 6. The subtle difference in ratiometric intensities between corresponding data points in cycles 1 and 2 is likely due to the uncontrolled thermal history of the first cycle. Overall, the cycling experiment provides additional evidence for the reliability and reproducibility of these measurements.

Thermal history. For most fluorescence measurements described herein, the intensity of the emission spectrum changed more than an order of magnitude across the temperatures investigated, dropping in intensity as the temperature was increased. As high fluorescence signal-to-noise is typically achieved by optimizing several different light acquisition parameters for a given sample, it is desirable to optimize those parameters at the temperature where the signal is most intense so as not to risk saturating the detector midway through a series of temperature dependent measurements with increasing signal. For this reason, fluorescence signal-to-noise was optimized at low temperatures for most of our measurements, at which point it was pragmatic to collect spectra upon heating.

Figure 5:
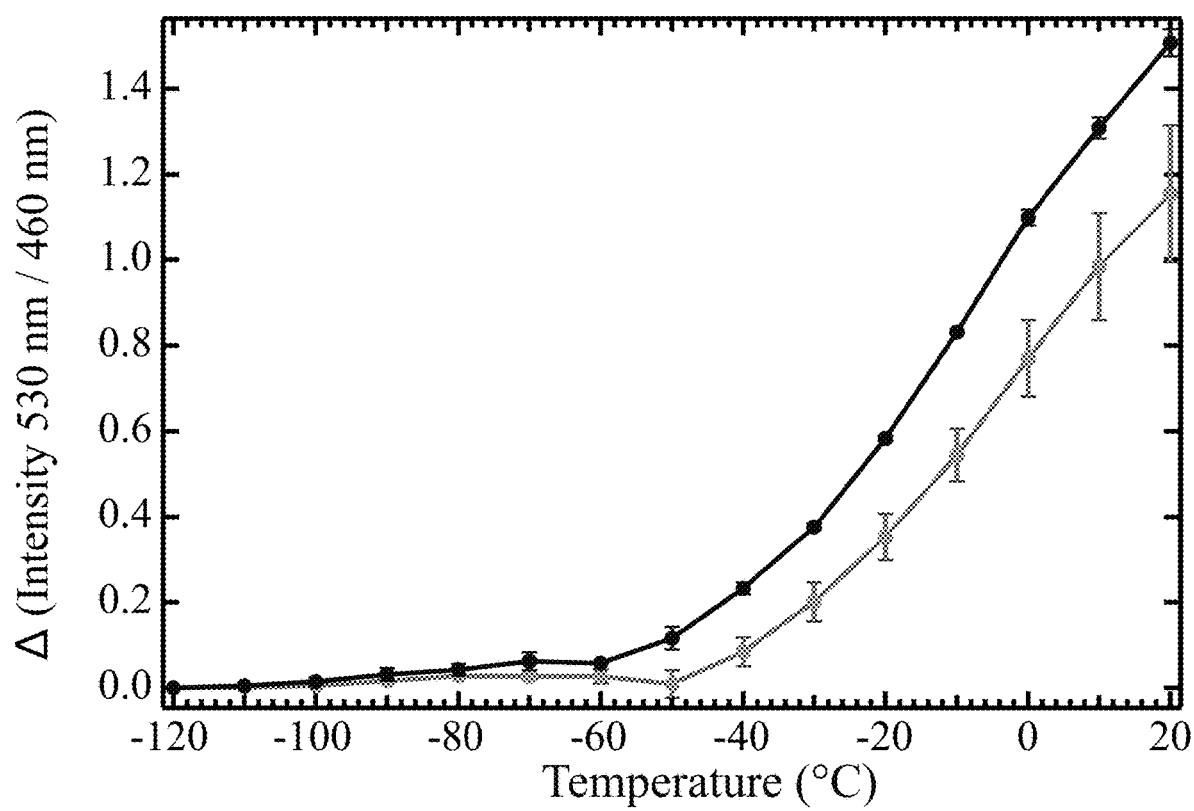
FIG. 5 illustrates temperature dependence of the ratiometric fluorescence intensity (530/460 nm) of bulk $PEI_{800}$ doped with 1 wt. % THPE upon heating at 1° C./min, according to some embodiments of the present disclosure. The cooling rate of one sample was controlled at 1° C./min (dark data set) while the other sample (lighter data set) was flash cooled to −120° C. in under 15 min.

Next, the fluorescence response of THPE doped PEI as a function of thermal history was evaluated to gauge the sensitivity of our technique in detecting and studying such phenomenon. FIG. 5 illustrates the fluorescence response of two samples with different thermal histories. The first was cooled slowly at 1° C./min from 20° C. to −120° C. while the second sample was quenched to −120° C. one order of magnitude more quickly (within ~15 minutes). Emission spectra were then collected for both samples at a heating rate of 1° C./min (representative spectra are illustrated in FIG. 1). A comparison of the two data sets in FIG. 5 reveals differences in the fluorescence response as a function of their cooling rate/thermal history. Those responses begin deviating from each other at approximately −70° C. (near $T_g$ estimated from DSC). For the sample with equivalent rates of heating and cooling, the smooth increase in ratiometric fluorescence intensity is consistent with a general increase in mobility and/or thermal expansion of the polymer matrix. In contrast, we observed that the ratiometric response of the rapidly cooled sample initially decreased upon heating from −70° C. to −50° C. before then increasing again at higher temperatures (see FIG. 5). In addition to illustrating the importance of controlling the thermal history of a sample, these results also highlight the power of the probe molecule to detect and study sensitive changes in glass forming kinetic phenomenon.

Figure 6:
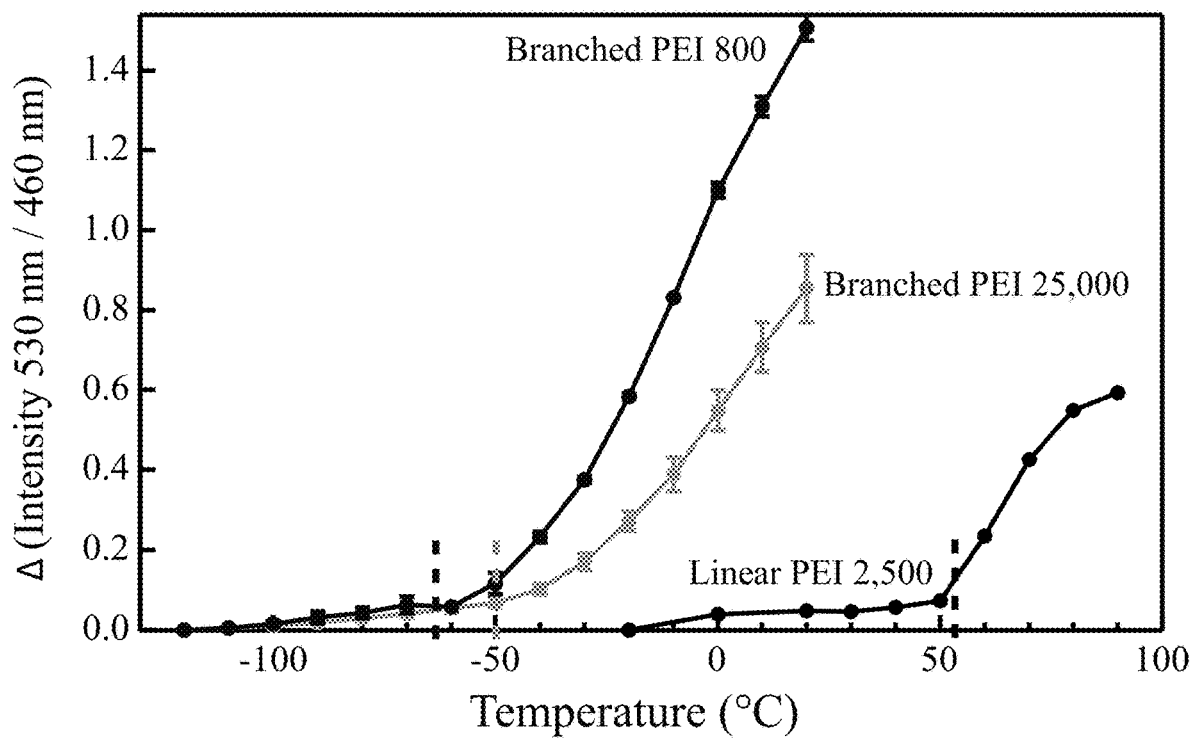
FIG. 6 illustrates temperature dependence of the ratiometric fluorescence intensity (530/460 nm) of branched $PEI_{800}$, branched $PEI_{25,000}$, and linear $PEI_{2500}$, according to some embodiments of the present disclosure. Dashed lines illustrate $T_g$ and onset of $T_m$ estimated from DSC.

PEI molecular weights and architecture. The fluorescence response of bulk linear $PEI_{2,500}$ as well as branched $PE_{800}$ and $PEI_{25,000}$ doped with THPE are illustrated in FIG. 6. The dashed lines on the plot indicate values of $T_g$ and the onset of $T_m$ estimated from DSC. As can be seen in this figure, there was a sharp transition in the ratiometric fluorescence response of THPE doped linear PEI between 50 and 60° C., which corresponds well to the onset of $T_m$ determined by DSC as 53° C. for this sample (see Table 1). The rapid change in fluorescence response is similar to that observed in the melt transitions of the small molecule matrices discussed earlier. In the branched PEI samples, the ratiometric fluorescence response is also pronounced as the material passes through a glass transition; however, changes in fluorescence response are generally more gradual in these amorphous polymers than in systems that experience formal melting. The behavior can be rationalized by considering that glass transitions are pseudo second-order transitions characterized by a change in slope of specific volume at $T_g$ rather than a large stepwise change in specific volume at $T_m$. It does not appear from the data illustrated in FIG. 6 collected down to −150° C. that sub-$T_g$ molecular motions can be detected with this probe molecule. The results suggest that the probe molecule is much more adept at detecting so-called α-relaxations than β or γ-relaxations.

Mobility of PEI in Confinement. Having studied the fluorescence response of THPE in large molecules (e.g., a polymer like PEI) and small molecule matrices, (e.g., a solvent like THF), the probe molecule response in more accurate models of DAC operating systems was investigated, namely PEI loaded mesoporous oxide composites. Here, the mobility of $PEI_{800}$ was studied in composites with native silanol-terminated silica (SBA15-OH) as well as hydrophobic functionalized silica (SBA15-CH$_3$), where silanol functional groups are capped with methyl groups via reaction with hexamethyldisilazane. The effect of polymer fill fraction in both composites was also investigated. The surface area and pore volumes of the parent materials and compositions containing polymer/probe molecule were characterized by nitrogen-physisorption isotherms, and the PEI content was determined via TGA. Nominal polymer fill fractions of 40 and 50 wt. % were targeted for SBA15-CH$_3$ and SBA15-OH, respectively, as these values are near the theoretical loading limit for each composite. Data characterizing these composites are summarized in Table 2.

TABLE 2

Characterization of PEI$_{800}$-Mesoporous Composites

| Sample | Surface Area (m$^2$/g) | Pore Volume (cm$^3$ g$^{-1}$) | Organic content (wt. %)$^a$ |
|---|---|---|---|
| 0 wt. % PEI/SBA15-OH | 782 ± 5 | 0.99 | 4.3$^b$ |
| 5 wt. % PEI/SBA15-OH | 504 ± 4 | 0.75 | 11 |
| 50 wt. % PEI/SBA15-OH | 43 ± 1 | 0.08 | 56 |
| 0 wt. % PEI/SBA15-CH$_3$ | 429 ± 6 | 0.66 | 8.1$^c$ |
| 5 wt. % PEI/SBA15-CH$_3$ | — | 0.64 | 12 |
| 40 wt. % PEI/SBA15-CH$_3$ | 75 ± 1 | 0.16 | 45 |

$^a$Estimated from mass loss between 150° C. and 895° C. via TGA.
$^b$Partially attributed to decomposition of silanol surface groups.
$^c$Due to the methyl groups.

Figure 7:
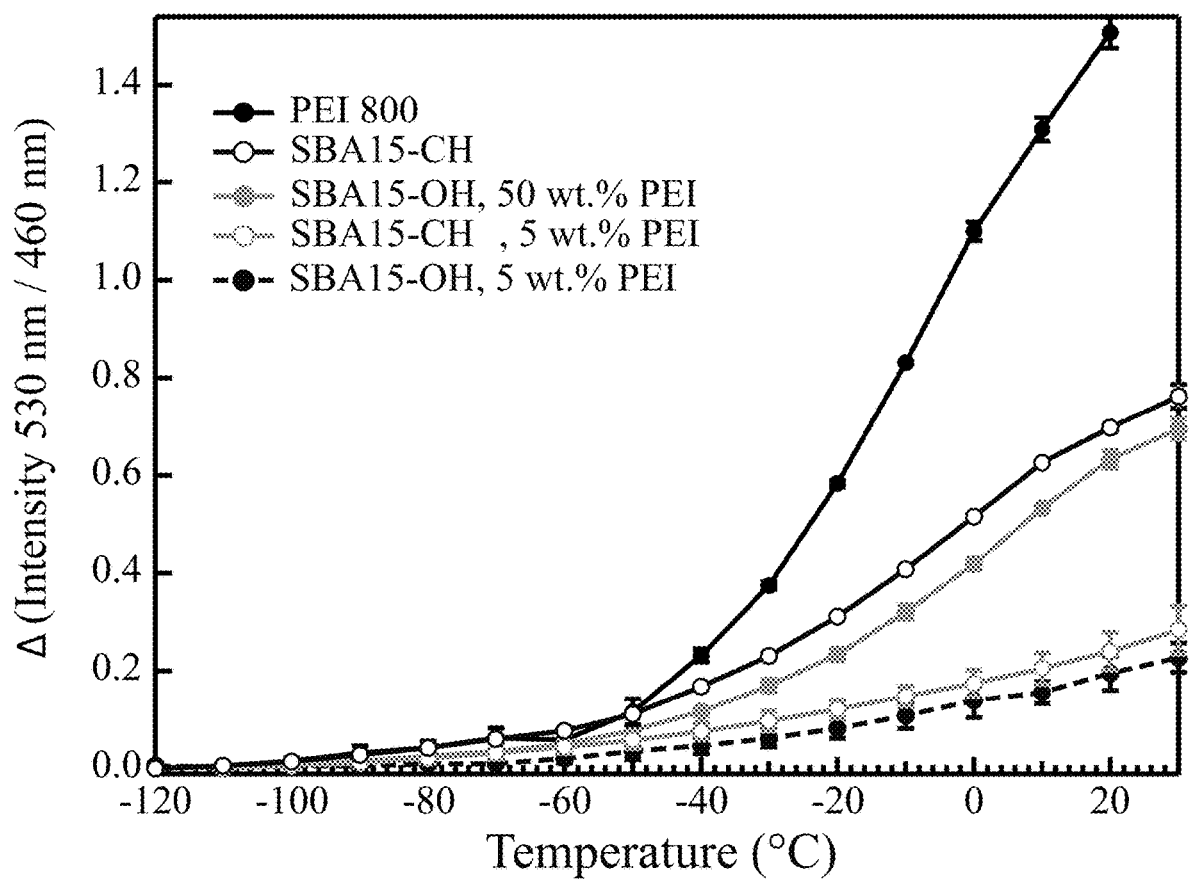
FIG. 7 illustrates temperature dependence of the ratiometric fluorescence intensity (530/460 nm) of bulk $PEI_{800}$ as well as mesoporous silica composites with different $PEI_{800}$ loadings and surface functional groups (—OH vs. —$CH_3$), according to some embodiments of the present disclosure.

FIG. 7 illustrates the ratiometric fluorescence data measured for the SBA15 compositions (solid support/polymer/probe molecule) alongside bulk polymer, e.g., PEI. The data indicates that confinement of PEI in mesoporous silica in all cases significantly lowers its molecular mobility relative to the bulk. A comparison of the fluorescence response for the two samples near their theoretical loading suggests PEI in the SBA15-CH$_3$ composite has higher mobility than PEI in SBA15-OH. The fluorescence data suggests that PEI in both 5 wt. % samples is significantly less mobile than that in the higher fill fraction composites, with 5 wt. % PEI/SBA15-OH containing the least mobile PEI of all samples investigated.

Figure 8:
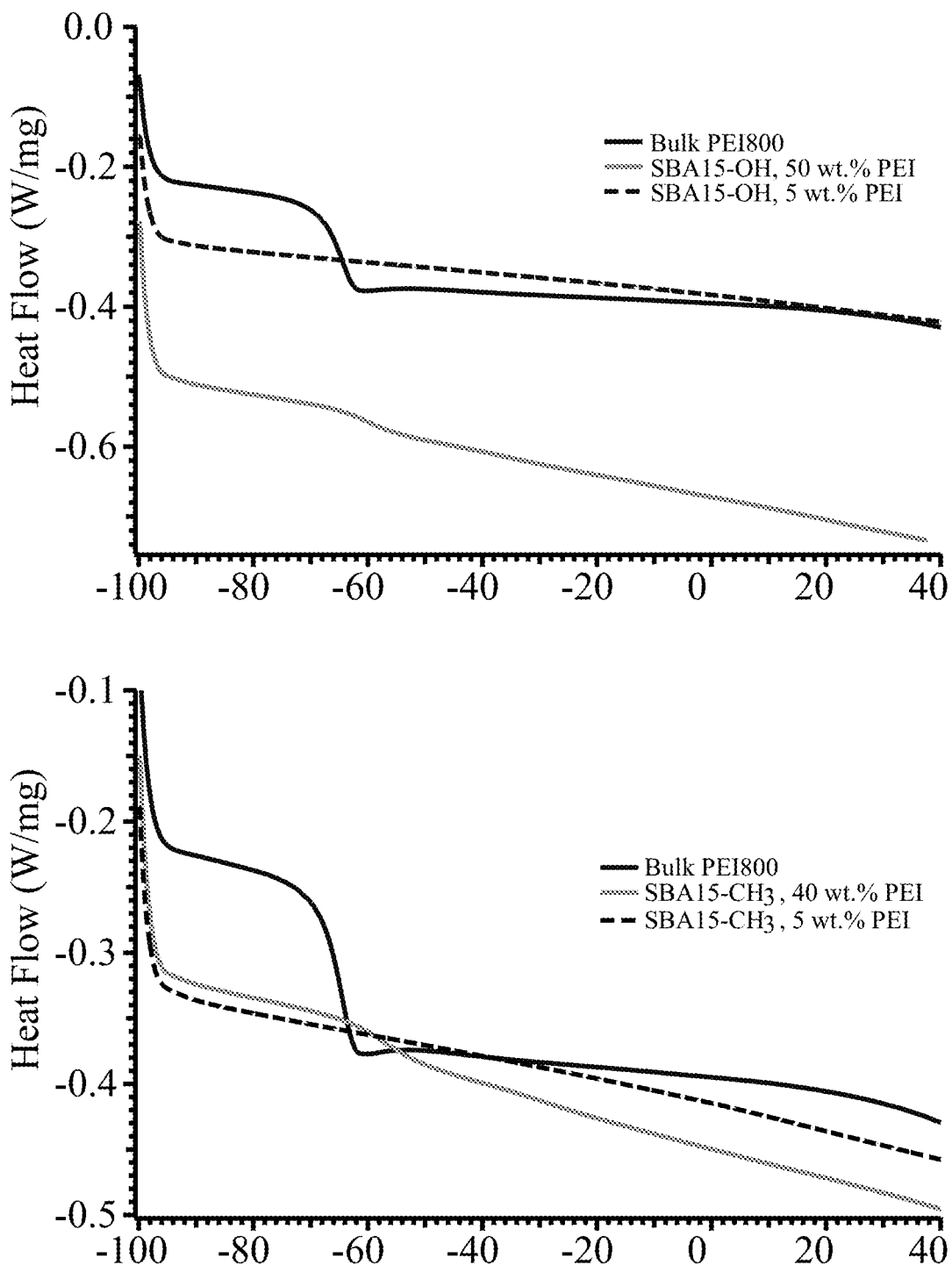
FIG. 8 illustrates DSC traces of PEI-mesoporous silica composites: SBA15-OH composites (top) and SBA15-$CH_3$ composites (bottom) alongside bulk $PEI_{800}$, according to some embodiments of the present disclosure.

Thermal transitions could be detected with DSC in the composites near their theoretical loading; a shift in PEI$_{800}$ $T_g$ was recorded from −65° C. in the bulk to between −58 and −56° C. in confinement (see FIG. 8). However, no thermal transitions were detected for the 5 wt. % composites. In the latter samples, a relatively high fraction of the material could be present both at the polymer-support and polymer-air interface. This can result in a large mobility gradient across the thin-supported films that can be difficult to disentangle. As such, this fluorescence technique allows for powerful qualitative comparisons of relative mobilities across different samples over a range of temperatures that few other benchtop techniques can provide.

Effect of Moisture and CO$_2$ uptake on Fluorescent Probe Response. In order to study the effect of moisture on the polymer mobility and accompanying changes in the fluorescence response of the probe, a series of branched-PEI:mesoporous Al$_2$O$_3$ samples were prepared with 40 wt. % PEI ((40 wt. %=(mass of PEI+THPE)/(mass of PEI+THPE+mass of alumina)*100%) with the PEI doped with 1 wt. % THPE relative to the polymer) and exposed to six different relative humidities. The samples equilibrated in a chamber for 72 hours at a given humidity, after which they were weighed. The change in weight (listed in Table 3) corresponds to the amount of water adsorbed by the composite.

TABLE 3

Moisture Uptake over 72 hours in
40 wt % B-PEI$_{800}$: Al$_2$O$_3$ Composite

| Relative Humidity (%) | H$_2$O uptake in 30.0 mg Composite (mg) |
| --- | --- |
| 11 | 1.8 |
| 33 | 4.0 |
| 53 | 6.2 |
| 75 | 10.4 |
| 100 | 20.2 |

Figure 9:
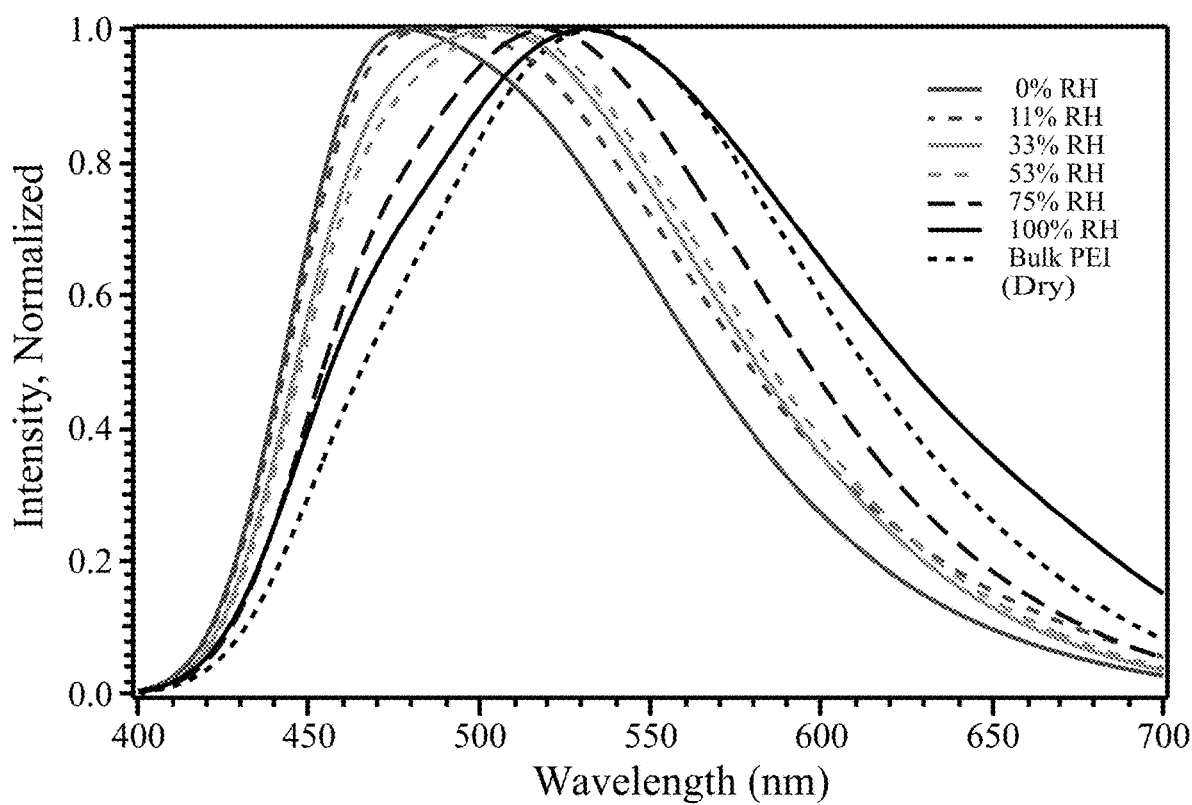
FIG. 9 illustrates fluorescence spectra of 0.4 wt. % THPE in a 40 wt. % $PEI_{800}$: $Al_2O_3$ composite as a function of relative humidity, and compared to the bulk, dry $PEI_{800}$ sample, according to some embodiments of the present disclosure.

The normalized fluorescence response of the probe in a dry composite and the 5 humidified composites is illustrated in FIG. 9. As the relative humidity increases, there is a clear red shift of the emission spectra observed, indicating the PEI mobility increases as moisture content increases. This result suggests that moisture acts as a 'plasticizer' for PEI chains.

Figure 10:
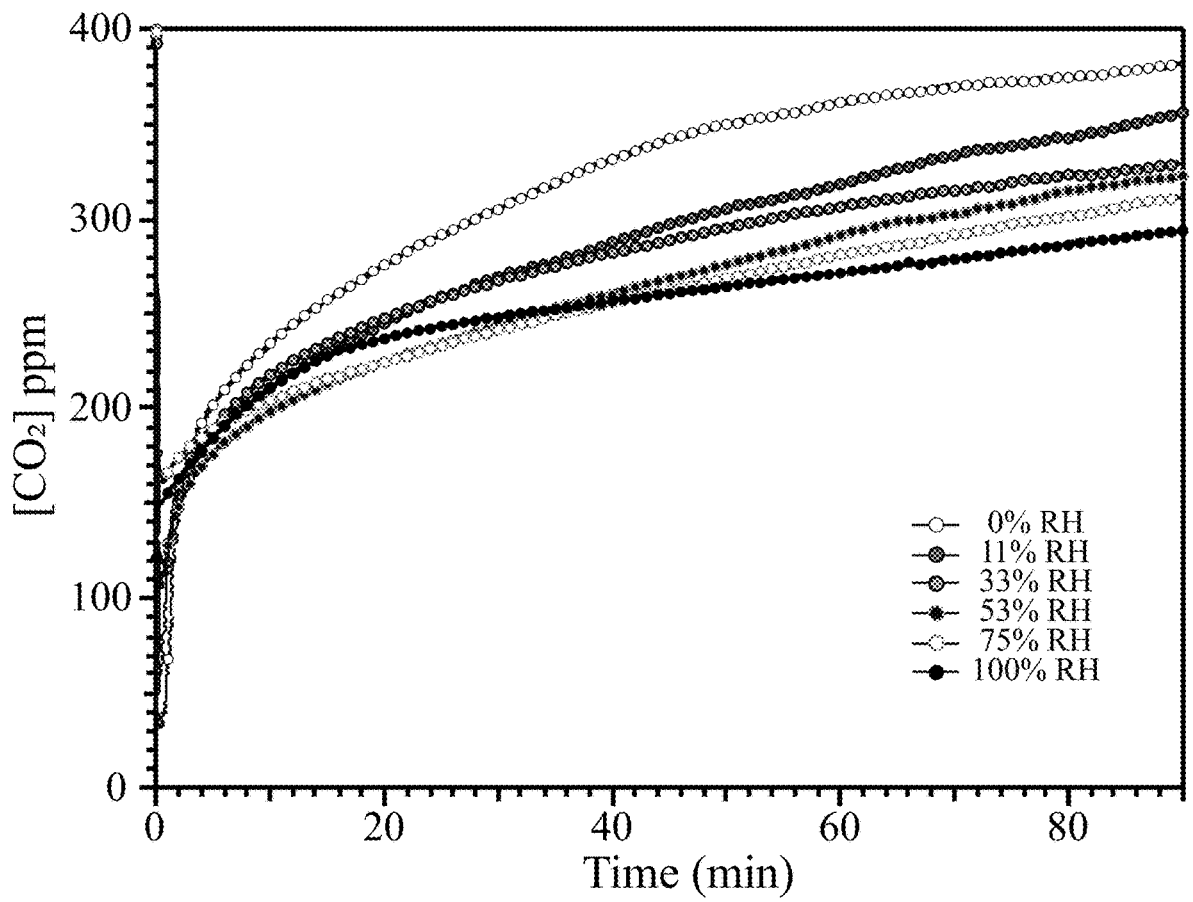
FIG. 10 illustrates $CO_2$ adsorption curves measured with a LiCOR-850 detector as a function of relative humidity. 40 wt. % $PEI_{800}$: $Al_2O_3$ composite, 100 sccm of 400 ppm $CO_2$ in $N_2$, according to some embodiments of the present disclosure.

A humidified stream of 400 ppm CO$_2$ in N$_2$ was then flowed over each composite, with the humidity of the stream tuned to match the humidity at which each sample had already been equilibrated. A LiCOR-850 detector, which is tuned to the infrared response of CO$_2$, was used to monitor CO$_2$ concentration of the stream after it passed over the composite sample. Thus, concentrations lower than 400 ppm indicate adsorption by the composite. FIG. 10 illustrates CO$_2$ adsorption data for the six composites. As seen in this data, more humid samples uptake greater amounts of CO$_2$ over this timeframe. These results suggest that (1) moisture changes the stoichiometry of the capture reaction, effectively doubling the CO$_2$ capacity of the amino polymer, and (2) that moisture acts as a plasticizer to keep the amino polymer fluid, enhancing the CO$_2$ uptake rate over longer reaction times compared to dry systems.

Figure 11:
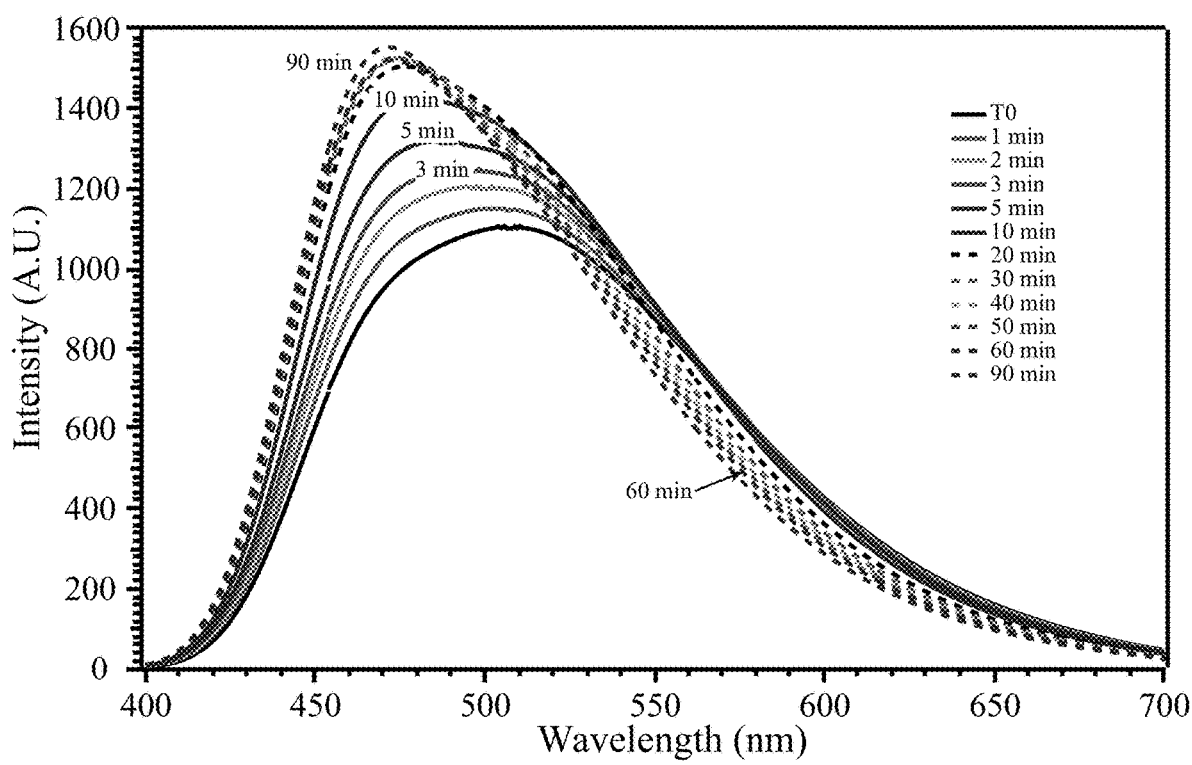
FIG. 11 illustrates changes in the fluorescence spectra of THPE in a 40 wt. % $PEI_{800}$: $Al_2O_3$ composite as a function of $CO_2$ uptake at 53% relative humidity. Flow rate: 100 sccm of 400 ppm $CO_2$ in $N_2$, according to some embodiments of the present disclosure.
Figure 12:
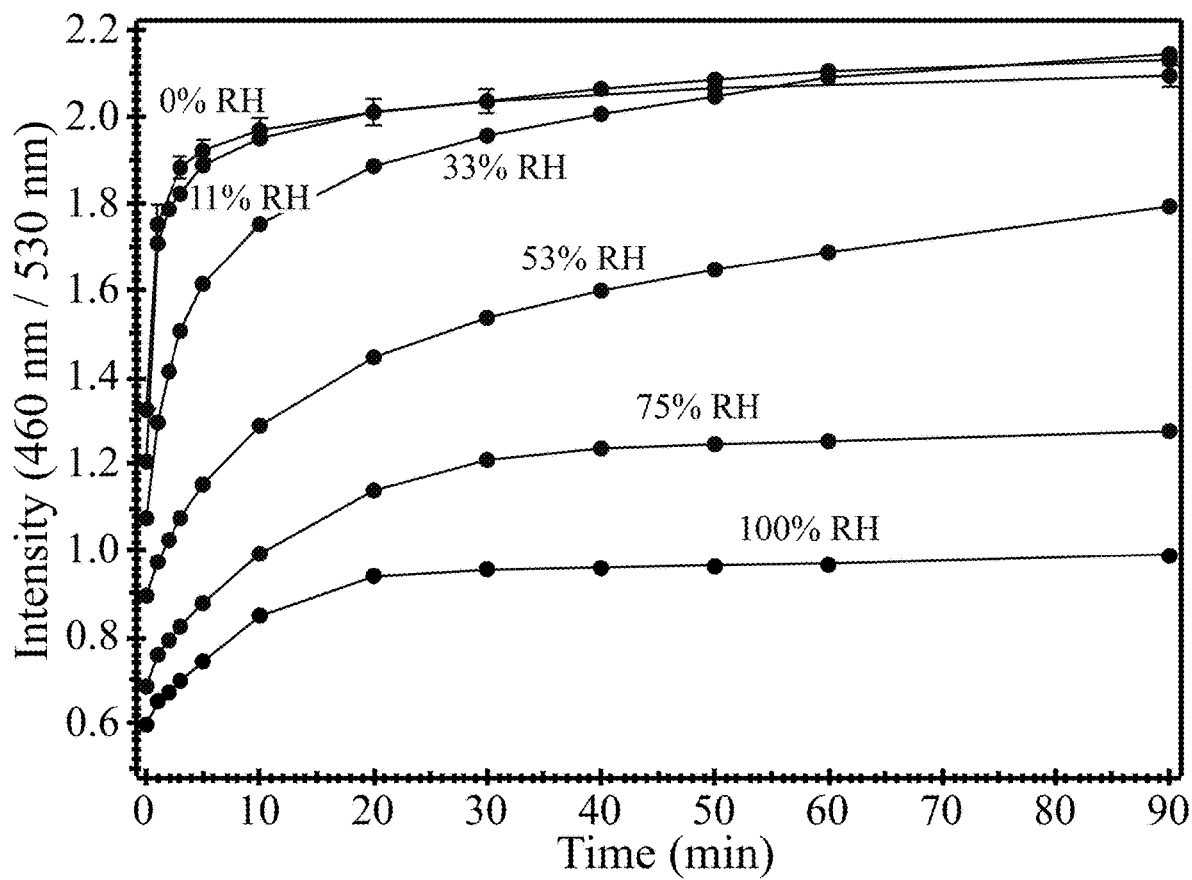
FIG. 12 illustrates a summary of ratiometric fluorescence intensity changes in 6 different humidified composites as a function of $CO_2$ uptake, according to some embodiments of the present disclosure. Larger ratios correspond to less mobile/less fluid polymer systems. 0.4 wt. % THPE in 40 wt. % $PEI_{800}$: $Al_2O_3$ composite. Flow rate: 100 sccm of 400 ppm $CO_2$ in $N_2$.

By simultaneously monitoring the fluorescence response of the composite along with CO$_2$ adsorption, one can directly correlate changes in polymer mobility to CO$_2$ uptake. FIG. 11 illustrates a representative example of the change in fluorescence response as a function of CO$_2$ uptake for the system at 53% relative humidity. The increase in intensity and the blue-shift in the emission indicate the PEI is becoming less mobile over time as it uptakes CO$_2$. FIG. 12 illustrates a summary of the data collected for the composites at six different relative humidities.

Experimental.

Materials. Tetraphenylethylene derivatives were purchased from TCI. 2,6-Dimethylbenzonitrile was purchased from Fischer Scientific. All other reagents, chemicals, and polymers were purchased from Aldrich and used without purification, unless otherwise noted. SBA15-OH and SBA15-CH$_3$ were synthesized according to literature procedures.

Fluorescent doping procedure. Bulk polymers and small molecules (e.g., solvents) were doped with tetrakis(4-hydroxyphenyl)ethylene (THPE) (between 0.02 wt. % and 1 wt. %) by stirring the mixtures under N$_2$ in the dark well above the m.p./glass transition temperature of a given matrix, (e.g., 50° C. for branched PEI, 100° C. for linear PEI). Composites were prepared by first stirring pre-doped PEI and SBA-15 in separate methanol solutions (~10 mg/mL) for 1 h, and then combining and further stirring for 3 h. The combined mixture was then placed on a rotary evaporator to remove the methanol. Final degassing was performed on a Schlenk line under vacuum (~100 mTorr) at 110° C. for 48 h in the dark to remove any CO$_2$, moisture, and residual solvent. Samples were left under vacuum and taken directly into an inert atmosphere for further handling.

Differential scanning calorimeter (DSC). The phase changes of the samples were compared with data obtained from a TA Instruments DSC 25 equipped with a Discovery liquid N$_2$ pump allowing a minimum sampling temperature of −150° C. Samples were prepared under an inert He atmosphere. The system was calibrated at the temperature ramp of choice using an indium reference sample prior to the measurements. The samples were heated at a 10° C./min ramp rate with a 50 mL/min N$_2$ flow through the cell and 307 mL/min base purge.

Isotherms. N$_2$ physisorption isotherms at 77 K performed in a Micromeritics TriStar 3020 were collected with 45 s equilibration time in the p/p$_0$ range of 0 to 0.001 which was decreased to 10 s for p/p$_{0>0.001}$. From these isotherms, the specific surface area and pore volume of the samples were extracted through the Brunauer-Emmett-Teller (BET) in the range of p/p$_0$ from 0.05 to 0.2 and the Barrett-Joyner-Halenda (BJH) method from the total N$_2$ adsorbed at p/p$_0$ 0.95, respectively.

Thermogravimetric analysis (TGA). PEI content in the composites was estimated using a TA Instrument Q600 TGA apparatus and a literature procedure. Weight loss from 120 to 900° C. under a 100 mL/min flow of N$_2$ diluted air was recorded at 10° C./min and normalized by the residual mass at 900° C.

Photoluminescence (PL) spectroscopy. PL experiments were conducted on a custom built Princeton Instruments spectrometer using a liquid N$_2$-cooled Si CCD (PyLoN) array for collecting visible-NIR spectra (400-900 nm). Intensity calibration was preformed daily using an IntelliCal USB-LSVN (9000-410) calibration lamp. Samples were placed in a 2 mm quartz cuvette and excited with a 365 nm LED (7.5 nm FWHM). A 400 nm longpass filter was employed between the sample and collection fiber. Emission spectra were collected from 200-800 nm using a 150 g/mm grating with 800 nm blaze and 3 mm slit; 20 spectra were averaged with an overall exposure time of ~5 seconds. Temperature control was achieved with an Oxford Instruments OptistatDN sample-in-N$_2$-vapor cryostat. Unless otherwise specified, polymer samples were both cooled and heated at a rate of ~1° C./min.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

EXAMPLES

Example 1. A composition comprising: tetrakis(4-hydroxyphenyl)ethylene (THPE); an amino polymer; and a substrate comprising a metal oxide, wherein: the substrate comprises a pore volume, and the THPE and the amino polymer are positioned within the pore volume.

Example 2. The composition of Example 1, wherein the amino polymer has a glass-transition temperature ($T_g$) between −65° C. and +100° C.

Example 3. The composition of either Example 1 or Example 2, wherein the amino polymer has a melting temperature ($T_m$) between −20° C. and +100° C.

Example 4. The composition of any one of Examples 1-3, wherein the amino polymer has a molecular weight greater than or equal to 600 g/mol.

Example 5. The composition of any one of Examples 1-4, wherein the molecular weight is between 800 g/mol and 200,000 g/mol.

Example 6. The composition of any one of Examples 1-5, wherein the amino polymer comprises a poly(ethylenimine) (PEI).

Example 7. The composition of any one of Examples 1-6, wherein the PEI comprises at least one of a linear PEI or a branched PEI.

Example 8. The composition of any one of Examples 1-7, wherein the PEI is branched.

Example 9. The composition of any one of Examples 1-8, wherein the PEI has a molecular weight between 600 g/mol and 1,000 g/mol.

Example 10. The composition of any one of Examples 1-9, wherein the THPE in the amino polymer is at a concentration between greater than 0 wt. % and 10 wt. %, relative to the total weight of the amino polymer and the THPE.

Example 11. The composition of any one of Examples 1-10, wherein the concentration is between 0.01 wt. % and 0.5 wt. %.

Example 12. The composition of any one of Examples 1-11, wherein the amino polymer and the THPE are present at a combined concentration between greater than 0 wt. % and less than 60 wt. %, relative to the total weight of the composition.

Example 13. The composition of any one of Examples 1-12, wherein the pore volume is between greater than 0 cm³/g and less than or equal to 10 cm³/g.

Example 14. The composition of any one of Examples 1-13, wherein the pore volume is between 0.1 and 1 cm³/g.

Example 15. The composition of any one of Examples 1-14, wherein the pore volume is characterized by a plurality of mesopores having an average diameter between 1 nm and 200 nm.

Example 16. The composition of any one of Examples 1-15 wherein the average diameter is between 30 nm and 80 nm.

Example 17. The composition of any one of Examples 1-16, wherein the metal oxide comprises at least one of alumina, silica, or titania.

Example 18. The composition of any one of Examples 1-17, wherein the silica is characterized by the presence of at least one of silanol groups or methyl groups.

Example 19. The composition of any one of Examples 1-18, wherein the silica is characterized by a surface area (SA) 30 m²/g≤SA<850 m²/g.

Example 20. The composition of any one of Examples 1-19, wherein the silica is characterized by a surface area (SA) 60 m²/g≤SA<500 m²/g.

Example 21. The composition of any one of Examples 1-20, wherein the THPE is soluble within the amino polymer and fluoresces when irradiated with light having a wavelength of about 365 nm.

Example 22. The composition of any one of Examples 1-21, wherein the amino polymer is capable of reversibly adsorbing and desorbing $CO_2$.

Example 23. The composition of any one of Examples 1-22, wherein: the amino polymer is capable of reversibly switching between a glassy state and at least one of a liquid state or rubbery state, when in the liquid state, the amino polymer is capable of adsorbing and desorbing $CO_2$, when the amino polymer contains between 0.001 moles and 1.0 mole of adsorbed $CO_2$ per mole of amine provided by the amino polymer, the amino polymer switches from the liquid state or rubbery state to the glassy state, when the amino polymer is in the liquid or rubbery state, the dissolved THPE fluoresces light with a $\lambda_{max1}$ between 480 nm and 540 nm, and when in the amino polymer is in a glassy state, the dissolved THPE fluoresces light with a $\lambda_{max2}$ between 455 nm and 480 nm.

Example 24. The composition of any one of Examples 1-23, wherein the amino polymer contains between 0.01 moles and 0.2 moles of adsorbed $CO_2$ per mole of amine provided by the amino polymer.

Example 25. The composition of any one of Examples 1-24, wherein $\lambda_{max1}$ is about 530 nm and $\lambda_{max2}$ is about 460 nm.

Example 26. A method comprising: a first transferring of $CO_2$ from a first gas stream to a composition comprising an amino polymer and THPE; and a second transferring of the $CO_2$ from the composition to at least one of a second gas stream or a vapor stream, wherein: the first transferring and the second transferring are repeated in series at least twice, the amino polymer is capable of reversibly switching between a glassy state and a liquid state or rubbery state, when in the liquid state or rubbery state, the amino polymer is capable of adsorbing the $CO_2$ during the first transferring, when in the liquid state or rubbery state, the amino polymer is capable of desorbing the $CO_2$ during the second transferring, when the amino polymer contains between 0.001 moles and 1.0 mole of adsorbed $CO_2$ per mole of amine provided by the amino polymer, the amino polymer switches from the liquid state or rubbery state to the glassy state, when the amino polymer is in the liquid or rubbery state, the dissolved THPE fluoresces light with a $\lambda_{max1}$ between 480 nm and 540 nm, and when in the amino polymer is in the glassy state, the dissolved THPE fluoresces light with a $\lambda_{max2}$ between 455 nm and 480 nm.

Example 27. The method of claim 26, wherein: a fluorescence metric for the THPE is correlated to the capacity of the amino polymer to reversibly absorb and desorb $CO_2$.

Example 28. The method of claim 27, wherein: when the THPE fluoresces within a first wavelength range, a $CO_2$ adsorption capacity of the amino acid is sufficiently high, and when the THPE fluoresces within a second wavelength range, the $CO_2$ adsorption capacity of the amino acid is insufficiently low.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
    tetrakis(4-hydroxyphenyl)ethylene (THPE);
    an amino polymer comprising poly(ethylenimine) (PEI); and
    a substrate comprising a metal oxide, wherein:
    the substrate comprises a pore volume, and
    the THPE and the amino polymer are positioned within the pore volume.

2. The composition of claim 1, wherein the amino polymer has a glass-transition temperature ($T_g$) between −65° C. and +100° C.

3. The composition of claim 1, wherein the amino polymer has a melting temperature ($T_m$) between −20° C. and +100° C.

4. The composition of claim 1, wherein the amino polymer has a molecular weight greater than or equal to 600 g/mol.

5. The composition of claim 1, wherein the PEI is branched.

6. The composition of claim 1, wherein the PEI has a molecular weight between 600 g/mol and 1,000 g/mol.

7. The composition of claim 1, wherein the THPE within the pore volume is at a concentration between greater than 0 wt. % and 10 wt. %, relative to the total weight of the amino polymer and the THPE.

8. The composition of claim 1, wherein the amino polymer and the THPE are present at a combined concentration between greater than 0 wt. % and less than 60 wt. %, relative to the total weight of the composition.

9. The composition of claim 1, wherein the pore volume is between greater than 0 cm$^3$/g and less than or equal to 10 cm$^3$/g.

10. The composition of claim 1, wherein the pore volume is characterized by a plurality of mesopores having an average diameter between 1 nm and 200 nm.

11. The composition of claim 1, wherein the metal oxide comprises at least one of alumina, silica, or titania.

12. The composition of claim 11, wherein the silica is characterized by a surface area (SA) 30 m$^2$/g≤SA<850 m$^2$/g.

13. The composition of claim 12, wherein 60 m$^2$/g≤SA<500 m$^2$/g.

14. The composition of claim 11, wherein the silica is characterized by the presence of at least one of silanol groups or methyl groups.

15. The composition of claim 1, wherein the THPE is soluble within the amino polymer and the THPE fluoresces when irradiated with light having a wavelength of about 365 nm.

16. The composition of claim 1, wherein the amino polymer is capable of reversibly adsorbing and desorbing $CO_2$.

17. The composition of claim 16, wherein:
    the amino polymer is capable of reversibly switching between a glassy state and at least one of a liquid state or rubbery state,
    when in the liquid state or the rubbery state, the amino polymer is capable of adsorbing and desorbing $CO_2$,
    when the amino polymer contains between 0.001 moles and 1.0 mole of adsorbed $CO_2$ per mole of amine provided by the amino polymer, the amino polymer switches from the liquid state or rubbery state to the glassy state,
    when the amino polymer is in the liquid or rubbery state, THPE dissolved in the amino polymer fluoresces light with a $\lambda_{max1}$ between 480 nm and 540 nm, and
    when the amino polymer is in a glassy state, THPE dissolved in the amino polymer fluoresces light with a $\lambda_{max2}$ between 455 nm and 480 nm.

18. The composition of claim 17, wherein the amino polymer contains between 0.01 moles and 0.2 moles of adsorbed $CO_2$ per mole of amine provided by the amino polymer.

19. The composition of claim 17, wherein $\lambda_{max1}$ is about 530 nm and $\lambda_{max2}$ is about 460 nm.

20. A method comprising:
    a first transferring of $CO_2$ from a first gas stream to a composition; and
    a second transferring of the $CO_2$ from the composition to at least one of a second gas stream or a vapor stream, wherein:

the composition comprises:
- tetrakis(4-hydroxyphenyl)ethylene (THPE);
- an amino polymer comprising poly(ethylenimine) (PEI); and
- a substrate comprising a metal oxide, wherein:
- the substrate comprises a pore volume, and
- the THPE and the amino polymer are positioned within the pore volume;

the first transferring and the second transferring are repeated in series at least twice, the amino polymer is capable of reversibly switching between a glassy state and a liquid state or rubbery state, when in the liquid state or rubbery state, the amino polymer is capable of adsorbing the $CO_2$ during the first transferring, when in the liquid state or rubbery state, the amino polymer is capable of desorbing the $CO_2$ during the second transferring, when the amino polymer contains between 0.001 moles and 1.0 mole of adsorbed $CO_2$ per mole of amine provided by the amino polymer, the amino polymer switches from the liquid state or rubbery state to the glassy state, when the amino polymer is in the liquid or rubbery state, THPE dissolved in the amino polymer fluoresces light with a $\lambda_{max1}$ between 480 nm and 540 nm, and when the amino polymer is in the glassy state, THPE dissolved in the amino polymer fluoresces light with a $\lambda_{max2}$ between 455 nm and 480 nm.

\* \* \* \* \*